United States Patent [19]

Thomas et al.

[11] Patent Number: 4,682,806
[45] Date of Patent: Jul. 28, 1987

[54] QUADRUPLE GRIPPER

[75] Inventors: Bradley S. Thomas, Plymouth; David J. Kargetta, Orlando, both of Fla.

[73] Assignee: General Electric Company, Charlottesville, Va.

[21] Appl. No.: 688,214

[22] Filed: Jan. 2, 1985

[51] Int. Cl.⁴ .............................................. B66C 1/00
[52] U.S. Cl. .................................. 294/88; 198/346.2; 198/468.2; 274/86.24; 274/87.1; 274/93; 414/736
[58] Field of Search ............... 414/736, 744 R, 744 A, 414/749, 750, 751, 222, 223, 225, 226; 294/87.1, 98.1, 93, 65, 88, 86.24; 198/346.1, 346.2, 468.2; 901/6, 7, 8

[56] References Cited

U.S. PATENT DOCUMENTS

| | | | |
|---|---|---|---|
| 3,610,673 | 10/1971 | Albin et al. | 294/65 |
| 3,782,561 | 1/1974 | Orii | 414/750 X |
| 3,834,213 | 9/1974 | Henzler et al. | 414/225 |
| 3,860,280 | 1/1975 | Karlsson | 294/65 X |
| 3,912,089 | 10/1975 | Lineberry et al. | 198/468.3 X |
| 4,480,865 | 11/1984 | Chamdru | 294/87.1 |
| 4,496,280 | 1/1985 | Brems | 414/749 |

Primary Examiner—Robert J. Spar
Assistant Examiner—Donald W. Underwood
Attorney, Agent, or Firm—James H. Beusse; Irving M. Freedman

[57] ABSTRACT

A central base of a gripper is adapted to be attached to a robot wrist flange. Carriage rods and stabilizing bars extend outwardly, on both sides of the central base. Sliding carriages, which move along the carriage rods on linear bearings, each carry two flexible urethane grippers which are capable of expanding and gripping a part from the inside when the flexible grippers are pressurized. Each carriage when slid from a first position to a second position by an air cylinder, causes the second flexible gripper of a carriage to occupy the same position in space that the first flexible gripper of the same carriage, previously occupied.

6 Claims, 5 Drawing Figures

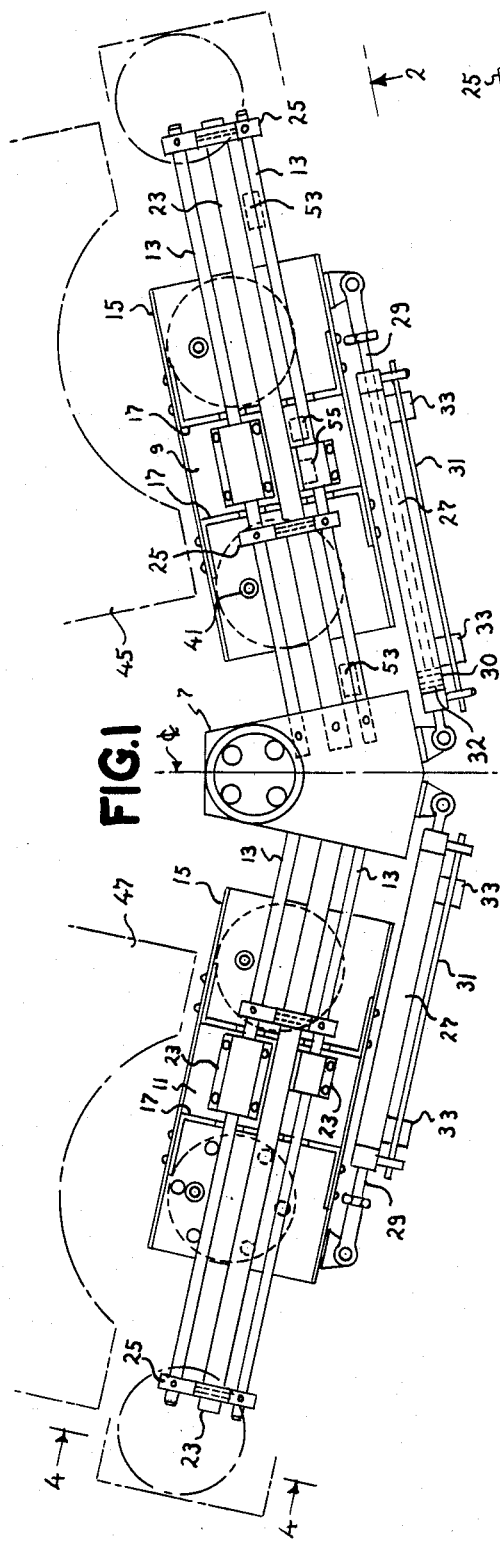
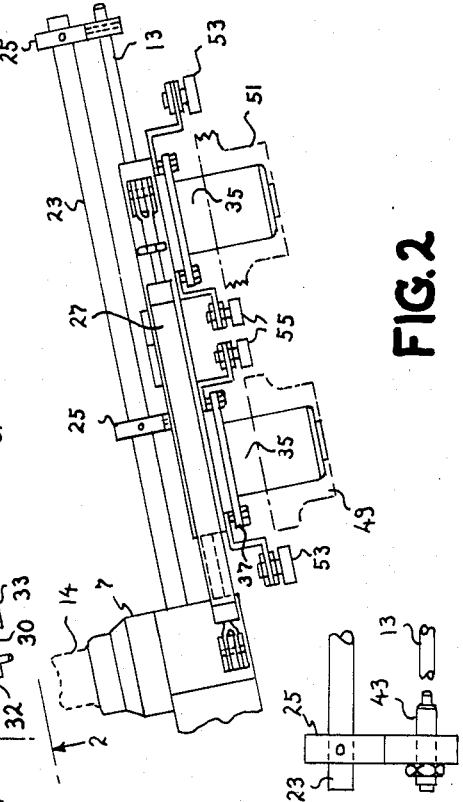
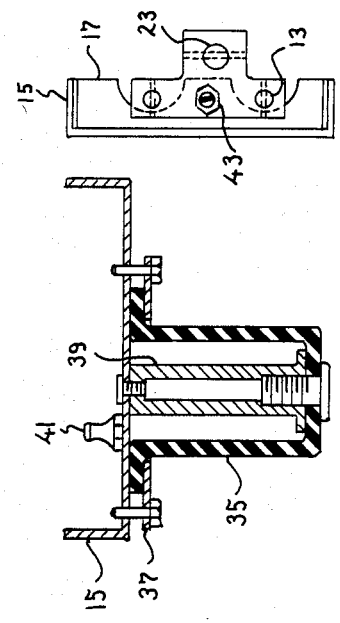

QUADRUPLE GRIPPER

BACKGROUND OF THE INVENTION

The present invention relates to a multiple part gripper for use with an industrial robot.

Machining centers having multiple stations fed by a rotating table are capable of performing multiple machining operation requiring completed work pieces to be removed and blank work pieces to be inserted in a rapid fashion to avoid increasing the cycle time of the machining center.

A single gripper for performing the insertion and removal tasks avoids the need of designing special purpose multiple part handling grippers but requires a faster and a larger robot to handle the increased stress due to the high speed movement required of the single gripper. Multiple part handling gripers can be heavy and introduce an additional load to be handled by the robot arm requiring a robot with larger load capability.

It is an object of the present invention to provide a multiple part handling gripper which minimizes robot arm motion required to insert and remove parts in a rotary work station.

It is a further object of the present invention to provide a multiple part gripper which provides rapid part removal and insertion while minimizing stress, allowing a smaller pay load, slower speed robot to be used than would otherwise be possible.

SUMMARY OF THE INVENTION

In one aspect of the present invention a multiple gripper for an industrial robot gripper is provided comprising a central base including means for mounting the base to the end of the robot arm. A first carriage assembly comprises a first carriage means and a first and second gripper means. The first and second gripper means are mounted, spaced apart from one another, to the first carriage means, with the first and second gripper means lying along a first axis. A second carriage assembly comprises a second carriage means and a third and fourth gripper means. The third and fourth gripper means are mounted, spaced apart from one another, to the second carriage means, with the third and fourth gripper means lying along a second axis. Mounted to the central base are means for slideably mounting the first and second carriage assemblies symmetrically about the central base portion, so that the first carriage assembly slides along the first axis and the second carriage assembly slides along the second axis. Means for selectively sliding both the first carriage assembly and second carriage at the same time from a first position to a second position are provided. The first position and the second position is separated by the same distance that separates the first and second gripper means of the associated carriage assemblies. Either gripper in either carriage assembly can be slid to the same position in space as the other gripper in the same carriage assembly.

DESCRIPTION OF THE DRAWING

While the invention concludes with claims particularly pointing out and distinctly claiming the present invention, the objects and advantages of the invention can be more readily ascertained from the following description of a preferred embodiment when used in conjunction with the accompanying drawing in which:

FIG. 1 is a top view of a quadruple gripper in accordance with the present invention;

FIG. 2 is a partial side view of the gripper of FIG. 1 along the lines 2—2;

FIG. 3 is a sectional view of an expandable gripper of FIG. 2;

FIG. 4 is an end view of the quadruple gripper of FIG. 1 along the lines 4—4; and FIG. 5 is a side view of the outside bracket of the quadruple gripper of FIG. 1 with the carriage rod removed, showing a shock absorber.

DETAILED DESCRIPTION OF THE INVENTION

Referring now to the drawing and particularly FIG. 1 thereof, a multiple gripper for handling four parts is shown. The multiple gripper comprises a central base 7 for mounting the multiple gripper to the wrist flange of a robot, such as a General Electric Company P5 robot, by means of bolts. The robot has a break away plastic disk used in mounting the multiple gripper to the wrist to protect the multiple gripper from damage if the multiple gripper should encounter an obstacle in its path. The central base supports two symmetrically arranged carriage assemblies 9 and 11 on either side of the central base. Each carriage assembly is mounted on carriage rods 13 extending from opposite sides of the central base and substantially perpendicular to the robot arm 14. The two carriage assemblies are positioned symmetrically about the center line of the central base. Each of the carriage assemblies comprise a carriage 15 fabricated from a sheet of aluminum formed into a flat floor portion with two sides parallel to the longitudinal axis of the carriage. Two ribs 17 extend between the two sides to add rigidity to the carriage. The right carriage 9 is supported by two linear bearings secured to the floor of the carriage by bolts. The linear bearings are shown as a single and a double pillow blocks 19 and 21, respectively providing three points support for the carriage. Carriage bars 13 are supported in a cantilever fashion from the central base 7 where the carriage bar ends are situated in a horizontally extending aperture. A stabilizer bar 23, comprising stainless steel tubing, is supported in a cantilever fashion with one end of the tubing extending in a horizontally extending aperture in the central base.

Brackets 25 are hung from the stabilizer bar 23 and support the carriage rods 13. One bracket is positioned spaced away from the central base and the other bracket is situated at the ends of the carriage rods and stabilizer bar not supported by the base.

As air cylinder 27 with a piston rod 29 extending into the air cylinder, has the body of the air cylinder mounted to the central base and the piston rod and extending outside the cylinder mounted to the carriage 15. A mounting track 31, extending the full length of the cylinder and rigidly mounted on both ends of the cylinder, supports two magnetic reed switches 33. On the periphery of the piston 32 located inside the cylinder, a permanent magnet 30 with sufficient magnetomotive force to operate the reed switches provides, an indication of piston position, and therefor carriage position. An air cylinder of this type with magnetic reed switches is available from Bimba Manufacturing Co., Monee, Ill, such as Model MRS-028DXPZ.

Referring now to FIGS. 2 and 3, expansion grippers 35 can be seen secured to the carriage floor by means of bolts, with the expansion grippers extending away from the carriage rods 13. A flexible, air tight, cylindrical chamber of urethane material is secured to the carriage floor by a toroidal clamp 37 and the cylindrical chamber is supported by a central rod 39. A port 41 provides a means for introducing and removing air to and from the chamber to expand and deflate the diameter of the gripper to grasp a part with a central opening.

Referring now to FIG. 4 the ribs 17 of the carriage 15 can be seen to have notches to provide clearance for the carriage rods, permitting the carriage to slide on the linear bearings along the carriage rods. A shock absorber 43 mounted to the support bracket 25 can be more clearly seen in FIG. 5. A shock absorber is also mounted on the inner bracket, although not shown. The shock absorbers provide smooth deceleration of the carriage assemblies when they are slid from a retracted position adjacent the inner bracket to an extended position adjacent the outer bracket.

Carriage assembly 11 is the mirror image of carriage assembly 9 with the carriage assemblies symmetrically arranged about a center line of the central base 7.

The operation of the quadruple gripper will now be explained. Referring to FIG. 1 two workholding fixtures 45 and 47 of a round rotating table of a machining center are shown. In the present embodiment the pneumatically powered expandable grippers are designed to handle the male and female portions of a pipe union. Male and female blank castings are to be exchanged for male and female machined parts in the workholding fixtures. In FIG. 2 the female blank is shown grasped by the inner gripper and a machined female part is shown grasped by the outer gripper. In the FIG. 1 the carriages are shown in a fully retracted position with the two outer grippers located over the workholding fixtures of the rotating table. The two air cylinders when supplied with compressed air both cause the carriages to slide to their fully extended position where the inner grippers on both carriage aligns with the workholding fixture. The phantom outline of the gripper in FIG. 1 shows the location of the outer grippers when the carriages are fully extended the air cylinder. The length of the stroke of the air cylinder is the same as the spacing between the grippers on the corresponding carriage. The spacing between the grippers on both carriages are the same, in the present embodiment, and the carriages are both retracted and extended at the same time to limit stress on the robot wrist.

The cycle begins with both carriages retracted and no parts in any of the grippers. The robot turns to the feed chutes and slips the inner grippers into male and female blanks. The inner grippers are pressurized and pulled from the chutes. The robot turn towards the machining center and enters it, inserting the outer grippers into the machined parts located in the rotary turn table and pressurizes the outer grippers. FIG. 2 shows the quadruple gripper with the female blank 49 on the inner gripper and the female machined part 51 on the outer gripper just prior to sliding the carriage to its extended position. The robot lifts the quadruple gripper assembly straight up and slides the gripper carriages so that they are in their extended position. The robot lowers the quadruple grippers to insert the blanks into the jaws of the rotary table. The blanks are released by depressurizing the grippers and the robot lifts up the quadruple gripper and the carriages are retracted. The robot moves back out of the machining center. After the machining center starts its cycle, the robot turns to the output conveyor and drops off the finished parts. The cycle can then begin again.

To determine whether a part has been successfully grasped or released, a photo sensor comprising a sending and receiving unit 53 and 55, respectfully, are positioned so that the light beam from the sensor unit is interrupted by the part being held by the gripper.

The reed switches 33 mounted on the air cylinder body provide an indication to the robot controller when the carriages are in their fully extended and fully retracted positions.

The foregoing describes a multiple part handling gripper which minimizes robot arm motion required to insert and remove parts in a rotary workstation and further provides rapid part removal and insertion which minimizing stress, allowing a smaller payload, slower speed robot to be used than would otherwise be possible.

While the invention has been particularly shown and described with reference to a preferred embodiment thereof, it will be understood by those skilled in the art that various changes in form and detail may be made without departing from the spirit and scope of the invention.

What is claimed is:

1. A quadruple gripper for attachment to a wrist flange of an industrial robot, the gripper comprising:
    a central base for mounting to the wrist flange;
    first and second pairs of carriage rods attached to and extending from opposing sides of said base;
    first and second symetrically arranged carriage assemblies mounted on said carriage rods, each of said carriage assemblies including a carriage member having a substantially flat floor portion and a pair of linear bearings attached to said floor portion and having apertures for slidably receiving a corresponding one of said carriage rods whereby said carriage assemblies are enabled to slide longitudinally of said rods;
    first and second pairs of grippers, each of said grippers being mounted to a corresponding one of said carriage assemblies; and
    actuator means for slidably moving each of said carriage assemblies over the extent of said carriage rods whereby each gripper of a pair of grippers can be positioned for manipulation of a component at any point within the extent of said rods.

2. The gripper of claim 1 and including:
    first and second stabilizer bars, each of said bars having one end thereof attached to said base, each of said bars extending parallel to a corresponding one of said pairs of carriage rods in a cantilever fashion; and
    support means attached to each of said cantilevered stabilizer bars at a distal end thereof, said support means depending from said bars and supporting said rods.

3. The gripper of claim 2 wherein said actuator means comprises:
    a pneumatic actuator having a cylinder and a moveable piston connected to a piston rod, said actuator being connected between said base and said carriage assembly whereby differential pneumatic pressure across said piston in said cylinder is effective to move said carriage assembly with respect to said base.

4. The gripper of claim 3 and including for each of said actuators:

a mounting track extending the length of said cylinder and rigidly attached to said cylinder at each end thereof;

first and second magnetic proximity switches attached to opposite ends of said track adjacent said cylinder; and a magnet coupled to said piston for actuating said switches when said piston is adjacent thereto, said switches providing an indication of the position of said piston.

5. The gripper of claim 1 wherein each one of each of said pairs of grippers comprises:

a cylindrical chamber of flexible material having an open end securely fastened to and abutting said floor portion;

a central rod passing axially through said chamber, one end of said rod being fixedly attached to said floor portion and another end thereof being attached to a closed end of said chamber to thereby maintain a fixed axial length of said chamber; and a port through said floor portion communicating with said chamber for introducing and removing pneumatic pressure thereby to cause said chamber to expand and contract radially for enabling grasping of a component.

6. The gripper of claim 4 and including a shock absorber mounted to each of said support means in alignment with the direction of motion of said carriage assemblies for providing smooth deceleration of said carriage assemblies.

* * * * *